United States Patent

[19]

Hoxmeier et al.

[11] Patent Number: 6,160,045

[45] Date of Patent: Dec. 12, 2000

[54] OIL GEL FORMULATIONS CONTAINING POLYETHYLENE-POLYDIMETHYLSILOXANE BLOCK COPOLYMERS DISSOLVED IN POLYDIMETHYLSILOXANE

[75] Inventors: Ronald James Hoxmeier; David Romme Hansen, both of Houston, Tex.

[73] Assignee: Shell Oil Company, Houston, Tex.

[21] Appl. No.: 09/307,284

[22] Filed: May 7, 1999

Related U.S. Application Data

[60] Provisional application No. 60/084,709, May 8, 1998.

[51] Int. Cl.[7] ............................. C08K 5/54; C08L 83/10; C08G 77/42
[52] U.S. Cl. .................. 524/261; 524/267; 524/588; 525/106; 528/14; 528/25; 528/33
[58] Field of Search ................................... 524/261, 267, 524/588; 525/106; 528/14, 25, 33

[56] References Cited

U.S. PATENT DOCUMENTS

| | | | |
|---|---|---|---|
| 4,123,409 | 10/1978 | Kaelble . | |
| 5,079,300 | 1/1992 | Dubrow et al. | 525/106 |
| 5,618,903 | 4/1997 | Hoxmeier et al. | 528/14 |
| 5,728,469 | 3/1998 | Mann et al. | 428/418 |
| 5,880,210 | 3/1999 | Schulz, Jr. et al. | 524/731 |

FOREIGN PATENT DOCUMENTS

| | | | |
|---|---|---|---|
| 0568102 A1 | 11/1993 | European Pat. Off. | C08L 83/04 |
| 0751170 A2 | 1/1997 | European Pat. Off. | C08G 77/26 |

*Primary Examiner*—Robert Dawson
*Assistant Examiner*—Jeffrey B. Robertson
*Attorney, Agent, or Firm*—Donald F. Haas

[57] ABSTRACT

This invention is a silicone oil gel composition which is comprised of a silicone block copolymer selected from the group consisting of polyethylene-polydimethylsiloxane block copolymers and polyethylene-polydimethylsiloxane-polydiphenylsiloxane block copolymers wherein the overall number average molecular weight ranges from 1000 to 21,000, preferably 1000 to 6000. The polyethylene blocks have a number average molecular weight of 400 to 3000, preferably 400 to 1500, the polydimethylsiloxane blocks have a number average molecular weight of 600 to 20,000, preferably 600 to 10,000, and the polydiphenylsiloxane blocks have a number average molecular weight of 200 to 2000, preferably 600 to 1200, wherein the block copolymer is dissolved in a silicone oil which is a polydimethylsiloxane polymer having a number average molecular weight of from 1000 to 1,000,000, preferably 4000 to 30,000.

5 Claims, No Drawings

OIL GEL FORMULATIONS CONTAINING POLYETHYLENE-POLYDIMETHYLSILOXANE BLOCK COPOLYMERS DISSOLVED IN POLYDIMETHYLSILOXANE

This application claims the benefit of U.S. Provisional Application No. 60/084,709, filed May 8, 1998, the entire disclosure of which is hereby incorporated by reference.

FIELD OF THE INVENTION

This invention relates to oil gel compositions for use in cosmetics, pharmaceutical products, and cable filling applications. More particularly, this invention relates to such compositions containing polyethylene-polydimethylsiloxane block copolymers and which utilize polydimethylsiloxane polymer as the oil.

BACKGROUND OF THE INVENTION

Silicone gel compositions have been used in a variety of products, including sunscreen gels, moisturizing creams, antiperspirant creams, liquid foundations, and hair gels. Known silicone gel compositions include compositions comprised of silicone oil and wax, silicone oil and silica, and silicone oil and polyoxyalkylene-containing organopolysiloxanes, such as described in European Published Patent Application No. 0,568,102. That application identifies a number of possibilities for components useful as the silicone oil including low and high viscosity diorganopolysiloxanes, including polydimethylsiloxane, cyclic siloxanes, cyclic siloxane solutions of polydimethylsiloxane gums, etc.

Linear block copolymers of polystyrene and polydimethylsiloxane have been synthesized, both by graft and block copolymerization. In block copolymerization of such linear polymers, polystyrene is produced by anionic polymerization with an organo lithium initiator and the living polymer (PS⁻Li+) created thereby is reacted with hexamethylcyclotrisiloxane, (Me₂SiO)₃, in the presence of a polar promoter wherein a block of polydimethylsiloxane grows on the end of the living vinyl aromatic hydrocarbon polymer block. U.S. Pat. No. 5,618,903 describes a block copolymer which is an anionically polymerized block copolymer which is comprised of at least one block of high density (HDPE) polyethylene and at least one block of a polysiloxane, e.g., polydimethylsiloxane. These polymers are useful for impact modification of engineering thermoplastics and forming coatings with low energy surfaces but have not been used or suggested for use as components of oil gels.

SUMMARY OF THE INVENTION

This invention is a silicone oil gel composition which is comprised of a silicone block copolymer selected from the group consisting of polyethylene-polydimethylsiloxane block copolymers and polyethylene-polydimethylsiloxane-polydiphenylsiloxane block copolymers wherein the overall number average molecular weight ranges from 1000 to 21,000, preferably 1000 to 6000. The polyethylene blocks have a number average molecular weight of 400 to 3000, preferably 400 to 1500, the polydimethylsiloxane blocks have a number average molecular weight of 600 to 20,000, preferably 600 to 10,000, and the polydiphenylsiloxane blocks have a number average molecular weight of 200 to 2000, preferably 600 to 1200, wherein the block copolymer is dissolved in a silicone oil which is a polydimethylsiloxane polymer having a number average molecular weight of from 1000 to 1,000,000, preferably 4000 to 30,000.

DETAILED DESCRIPTION OF THE INVENTION

The polyethylene-polydimethylsiloxane block copolymers of this invention and the method of making them are fully described in U.S. Pat. No. 5,618,903, which is herein incorporated by reference. The polyethylene-polydimethylsiloxane-polydiphenylsiloxane block copolymers of this invention are made in a similar manner as described below.

In general, when solution anionic techniques are used, polymers of anionically polymerizable monomers are prepared by contacting the monomer to be polymerized simultaneously or sequentially with an anionic polymerization initiator such as Group IA metals, their alkyls, amides, silanolates, naphthalides, biphenyls and anthracenyl derivatives. It is preferable to use an organo alkali metal (such as sodium or potassium) compound in a suitable solvent at a temperature within the range from −150° C. to 300° C. preferably at a temperature within the range from 0° C. to 100° C. Particularly effective anionic polymerization initiators are organo lithium compounds having the general formula:

$$RLi_n$$

wherein R is an aliphatic, cycloaliphatic, aromatic or alkyl-substituted aromatic hydrocarbon radical having from 1 to 20 carbon atoms; and n is an integer of 1–4.

In general, any of the solvents known in the prior art to be useful in the preparation of such polymers may be used. Suitable solvents, then, include straight- and branched-chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as, alkyl-substituted derivatives thereof; aromatic and alkyl-substituted derivatives thereof; aromatic and alkyl-substituted aromatic hydrocarbons such as benzene, naphthalene, toluene, xylene and the like; hydrogenated aromatic hydrocarbons such as tetralin, decalin and the like; linear and cyclic ethers such as methyl ether, methyl ethyl ether, diethyl ether, tetrahydrofuran and the like.

Ethylene may be polymerized as described above with the addition that it is usually best to include a promoter, such as a diamine, to facilitate the reaction. Examples of these amines which include but are not limited to follow: N,N, N',N'-tetramethylmethylenediamine (TMMDA), N,N,N',N'-tetramethylethylenediamine (TMEDA), N,N,N',N'-tetraethylethylenediamine (TEEDA), N,N,N',N'-tetramethyl-1,3-propanediamine (TMPDA), N,N,N', N'tetramethyl-1,4-butanediamine (TMBDA), dipiperidinomethane (DIPIM), 1,2dipiperidinoethane (DIPIE), 1,8-bis(dimethylamino)naphthalene, N,N,N', N'tetramethyl-o-phenylenediamine (TMOPDA), 1,2-dipyrolidinoethane (DIPIP), 1,3-dipiperidinopropane (DIPIP), 1,2-bis(2,6-dimethylpiperidino)cyclohexane (BDMPC), sparteine, and the like.

The ethylene polymerization reaction can be carried out at 0° C. to 100° C. preferably 25° C. to 60° C. The ethylene pressure can be from 10 psig to 1000 psig, preferably 100 to 500 psig. The polymerization time can run from 10 minutes to 2 hours, preferably 30 minutes to 1 hour.

When the polymerization of the ethylene is complete, living polyethylene blocks are present in the polymerization mixture. These are perfectly linear polyethylene-alkyllithiums. These living polyethylenes can then be reacted with cyclic siloxane monomers $(R_1R_2SiO)_n$, where n=3–10, $R_1$ and $R_2$=alkyl $(C_1-C_{20})$, alkenyl $(C_2-C_{20})$, hydrogen, benzyl or phenyl (including alkyl substituted aromatics and polycyclics) and $R_1$ and $R_2$ can be the same or different. Specific siloxane monomers include $(Me_2SiO)_3$, $(MeHSiO)_3$, $(Me_2SiO)_4$, $(Me_2SiO)_5$, $(MeHSiO)_4$, $(MeHSiO)_5$, $(Ph_2SiO)_3$, $(Ph_2SiO)_4$, $(Ph_2SiO)_5$, $(PhHSiO)_4$, $(PhHSiO)_5$, $(PhHSiO)_3$, $(vinylmethylSiO)_4$, $(vinylmethylSiO)_5$, $(vinylHSiO)_3$, $(vinylHSiO)_4$, $(vinylHSiO)_5$, $(vinylmethylSiO)_3$, $(PhMeSiO)_3$, $(PhMeSi)_4$, $(PhMeSiO)_5$. Mixtures of monomers can also be used. When a polydimethylsiloxane block initiated with RLi is desired, the monomer is preferably hexamethylcyclotrisiloxane (D3) or octamethylcyclotetrasiloxane (D4).

This polymerization is carried out in the presence of a polar promoter, including, but not limited to, the promoter present during the ethylene polymerization step. Additional promoter can be added. Such promoters include but are not limited to diethers and/or diamines, such as diethylglyme and/or TMEDA, cyclic ethers such as tetrahydrofuran, and any promoter known to be useful in anionic polymerizations. Its purpose is to decrease the reaction time of the D3 polymerization. Preferably, this reaction is carried out at a temperature of from 30° C. to 120° C., the concentration of the cyclic siloxane monomer (described herein in terms of hexamethylcyclotrisiloxane) is from 1 to 80 percent by weight, and the amount of promoter used ranges from 100 ppm to essentially 100 percent by weight (i.e. the polar promoter is used as solvent). The temperature range is important because higher temperatures cause more rapid reaction. The promoter concentration range is important for the same reason. The reaction may be carried out at up to 80 weight percent solids, preferably 10 to 80 percent. This is advantageous because higher solids offer economic advantages because less solvent is necessary.

The living block copolymer can be recovered directly to give PE-PDMS-O—Li$^+$ which is a living polymer and has not been terminated. One could manufacture and sell the living polymer itself to others that could then react it to form other polymers and/or add other functionalities such as amino, alcohol, carboxylate, and other heteroatom functionalities. Termination of the polymer may be achieved by several conventional means. If desired, the polymer can be capped with $R_3R_4R_5$—SiX, e.g., to give PE-PDMS-SiR$_3$R$_4$R$_5$, where the R's can be alkyl, alkenyl $(C_2-C_{20}$, preferably a vinyl group because of its high reactivity), phenyl, benzyl, hydrogen, and the like, and can be the same or different, and X is halogen, preferably chlorine, or alkoxide, preferably $C_1-C_{20}$. It can be protonated with, e.g., acetic acid, to give PE-PDMS-OH. It can also be coupled with, e.g., SiCl$_4$, Me$_2$SiCl$_2$, HSi(OMe)$_3$ with coupling agent functionalities from 2 to about 12 to give (PE-PDMS)$_n$, where n=the number of coupling agent functionalities. The coupling or capping reaction can be carried out from 40 to 100° C. for 5 minutes to 1 hour, preferably 70 to 100° C. for about 10 to 15 minutes.

When it is desired to add a polydiphenylsiloxane block to the block copolymer, the procedure is similar to that described above to make the polydimethylsiloxane block. The monomer used is $(Ph_2SiO)_3$, $(Ph_2SiO)_4$, or $(Ph_2SiO)_5$, preferably $(Ph_2SiO)_3$. The reaction conditions for the capping reactions with $(Ph_2SiO)_3$ are typically 90 to 120° C. for 1 to 3 hours.

The block copolymers of this invention have an overall number average molecular weight of from 1000 to 21,000, preferably from 1000 to 6000. The polyethylene blocks have number average molecular weights of from 400 to 3,000, and most preferably from 400 to 1500. The number average molecular weights of the polydimethylsiloxane blocks vary from 600 to 20,000, preferably 600 to 10,000. The number average molecular weights of the polydiphenylsiloxane blocks vary from 200 to 2000, preferably 600 to 1200.

The siloxane oil gel compositions of the present invention utilize the above block copolymers as the gelation agent portion of the composition. The oil or solvent portion of the compositions is comprised of a polydimethylsiloxane homopolymer. The number average molecular weight of the polydimethylsiloxane oil can range from 1000 to 1,000,000, preferably 4000 to 30,000. The block copolymers described above form stable gels when they are dissolved in the polydimethylsiloxane oil. The polydimethylsiloxane polymers used as the oil are commercially available from many sources.

The polydimethylsiloxane oils are made in the same manner as the polydimethylsiloxane blocks of the block copolymers of this invention. The oils may be terminated, protonated, coupled, and/or capped as the PDMS blocks may be. They may be linear or branched polymers and may be functionalized with the same functionalities as the PDMS blocks may be, on one or both ends or randomly (or blocked) on the backbone or side chains.

The block copolymers are mixed into the oil by heating at 175 to 250° C. from 1 to 2 hours.

The siloxane oil gel compositions of this invention are useful as additives in cosmetic or pharmaceutical compositions, cable filling applications, etc.

EXAMPLES

Two different polydimethylsiloxane polymer oils were used to dissolve a variety of siloxane polymers. One had a low number average molecular weight (MW) of about 4000 and the other had a high MW of about 30,000. The polymers were dissolved by heating at 175 to 250° C. for 1 to 2 hours then cooling to room temperature where gelation occurred. These gels can be recycled (re-liquified) simply by heating to about 75° C. or higher.

The results are shown in Tables 1 and 2. PS indicates a polystyrene block. PDMS is polydimethylsiloxane. PE is polyethylene. PI is polyisoprene. EP is hydrogenated polyisoprene. PDPS is polydiphenylsiloxane. It can be seen that only the polymers which are within the scope of this invention, Polymers 6 and 7, form a gel. Polymers 12 and 13 are graft copolymers rather than block copolymers.

TABLE 1

Low MW PDMS Si-Oil Gels

| Polymer | Polymer Type & Description | % wt | GEL | T/t* |
|---|---|---|---|---|
| 1 | PS-PDMS-PS 8.5K-31K-8.5K | 5% | No dissolution = insoluble | 175° C./2 hrs |
| 2 | PS-PDMS-PS 6K-68K-6K | 10% | No dissolution | 175° C./2 hrs |
| 3 | PS-EP-PDMS 8K-12K-60K | 10% | No dissolution | 175° C./2 hrs |
| 4 | PS-PE-PDMS 8K-12K-60K | 10% | No dissolution | 175° C./2 hrs |
| 5 | PS-PI-PDMS 8K-12K-60K | 10% | No dissolution | 175° C./2 hrs |
| 6 | PE-PDMS-PDPS-Li 0.6K-3.6K-0.6K | 10% | GEL No grav. flow 1 wk | 175° C./2 hrs |
| 7 | PE-PDMS-Li 0.6K-3.6K | 10% | GEL No grav. flow 1 wk | 175° C./2 hrs |

*T = temperature, t = time

TABLE 2

High MW PDMS Si-Oil Gels

| Polymer | Polymer Type & Description | % wt | GEL | T/t* |
|---|---|---|---|---|
| 8 | PS-PDMS-PS 6K-50K-6K | 10% | No dissolution | 175° C./2 hrs |
| 9 | PE-EP-PDMS 3K-0.5K-5K | 10% | No dissolution | 175° C./2 hrs |
| 1 | PS-PDMS-PS 8.5K-31K-8.5K | 10% | No dissolution | 175° C./2 hrs |
| 10 | PS-PDMS 14K-16K | 10% | No dissolution | 175° C./2 hrs |
| 6 | PE-PDMS-PDPS-Li 0.6K-3.6K-0.6K | 10% | GEL No grav. flow 2 wks | 175° C./2 hrs |
| 7 | PE-PDMS-Li 0.6K-3.6K | 10% | GEL No grav. flow 2 wks | 175° C./2 hrs |
| 11 | PE-PDMS 3K-3K | 10% | No dissolution | 175° C./2 hrs |
| 2 | PS-PDMS-PS 6K-68K-6K | 10% | No dissolution | 175° C./2 hrs |
| 12 | $(PE)_x(PDMS)$ | 10% | No dissolution | 250° C./1 hr |
| 13 | $(C_{18})_x PDMS$ | 10% | No dissolution | 250° C./1 hr |

*T = temperature, t = time

We claim:

1. A silicone oil gel composition which is comprised of a silicone block copolymer selected from the group consisting of polyethylene-polydimethylsiloxane block copolymers and polyethylene-polydimethylsiloxane-polydiphenylsiloxane block copolymers wherein the overall number average molecular weight of the copolymer is from 1000 to 21,000, the polyethylene blocks have a number average molecular weight of 400 to 3000, the polydimethylsiloxane blocks have a number average molecular weight of 600 to 20,000, and the polydiphenylsiloxane blocks have a number average molecular weight of 200 to 2000, wherein the block copolymer is dissolved in a silicone oil which is a polydimethylsiloxane polymer having a number average molecular weight of from 1000 to 1,000,000.

2. The composition of claim 1 wherein the overall molecular weight is 1000 to 6000.

3. The composition of claim 2 wherein the polyethylene block molecular weight is 400 to 1500.

4. The composition of claim 3 wherein the polydimethylsiloxane block molecular weight is from 600 to 10,000.

5. The composition of claim 4 wherein the polydiphenylsiloxane block molecular weight is 600 to 1200.

* * * * *